United States Patent [19]

Lin

[11] Patent Number: 4,575,944

[45] Date of Patent: Mar. 18, 1986

[54] ELECTRONIC DIGITAL TAPE-RULE

[76] Inventor: Patrick Lin, 12th Fl., No. 1034, Min Sheng East Rd., Taipei, Taiwan

[21] Appl. No.: 746,410

[22] Filed: Jun. 19, 1985

[51] Int. Cl.$^4$ .............................................. G01B 3/10
[52] U.S. Cl. ...................................... 33/138; 33/139; 33/125 C; 250/237 G; 377/24
[58] Field of Search ................. 33/138, 125 C, 143 L, 33/139, 140; 250/237 G; 377/24; 364/562

[56] References Cited

U.S. PATENT DOCUMENTS

| | | | |
|---|---|---|---|
| 4,150,282 | 4/1979 | Aoki et al. | 33/139 |
| 4,164,816 | 8/1979 | Bergkvist | 33/139 |
| 4,178,691 | 12/1979 | Tateishi | 33/139 |
| 4,181,959 | 1/1980 | Tateishi | 33/138 |
| 4,181,960 | 1/1980 | Tateishi | 33/138 |
| 4,316,081 | 2/1982 | Washizuka et al. | 33/139 |

FOREIGN PATENT DOCUMENTS 2826030 6/1977 Fed. Rep. of Germany ........ 33/138

*Primary Examiner*—Willis Little
*Attorney, Agent, or Firm*—Burns, Doane, Swecker & Mathis

[57] ABSTRACT

An electronic digital tape rule consisting of a housing, a tape reel having an extendable and flexible measuring tape, a battery case, an actuator, a detector, a counter, a display and a brake. The actuator comprises a friction roll rotatably mounted on a shaft fixed at an inner wall of the housing, a disc disposed on the upper end of the roll and rotatable by the friction of the roll, a plate fixed on the upper end of the roll and having a hole with a pair of contact plates attached on the two side walls of the hole, a spring mounted between the disc and the plate for constantly pressing the disc against the roll and an actuating rod disposed upright on the upper side of the disc and having its upper end engaging with the hole. The actuating device in cooperation with the friction rolls can accomplish the switching action corresponding to the directions of rotation of the friction rolls.

3 Claims, 4 Drawing Figures

ELECTRONIC DIGITAL TAPE-RULE

BACKGROUND OF THE INVENTION

The present invention relates to an electronic digital taperule and, more particularly, to an actuating device for the electronic digital tape measure.

A conventional electronic digital tape measure was disclosed, for example, in U.S. Pat. Nos. 4,031,360 to Soule, and 4,316,081 to Washizuka. In the former reference, a measuring tape was formed of links fitted to each other, with each link perforated by a through hole, that is, the measuring tape had a considerably large volume and the housing of the tape measure was not compact. Furthermore, since the conventional measuring tape was not flexible per se, it was impossible to determine the length of curves such as the circumferential length of a tube or cylinder. The conventional measuring tape was also apt to damage fingers, etc. because of its sharp edges.

In order to eliminate such drawbacks in U.S. Pat. No. 4,031,360, U.S. Pat. No. 4,316,081 provides a compact electronic digital tape measure having an improved flexible measuring tape structure capable of measuring both the length of straight line and curves. In this patent, there is disclosed a flexible measuring tape constituted by allocating a number of magnetic balls in predetermined space from each other and by locating a number of non-magnetic balls to provide the space therebetween. The chain of the magnetic balls and the non-magnetic balls is buried within a flexible tape generally made from synthetic resin and the like. Due to the complicated special structure of the flexible tape, it is difficult to manufacture such a tape and the manufacturing cost is considerable high. U.S. Pat. No. 4,031,360 also provides a common flexible measuring tape which has no special structure similar to the above-mentioned flexible tape. An electronic actuating and detecting device comprising a photoelectric sensor, a rotatable disc having slits, a counter, a display and a pressure roller is provided within the housing and its arrangement is such that the detecting device may detect the measuring tape pulled out from the housing through said pressure roller and disc, and generate a series of signals to the counter to display the corresponding length of the tape in digit form through an electronic circuit. According to the above-said known digital tape measure, the disclosure relates to the basic arrangement and principle of the assembly only and does not account for a detail in constitution and relation in the components, especially, the actuating device which is very important to a tape measure. Therefore, there exists many problems in the manufacture or work-out of the known tape measure, and even in making the invention a practical use.

SUMMARY OF THE INVENTION

Accordingly, it is the primary object of the invention to provide a practical construction of an actuating device for electronic digital tape-rule having superior operability.

It is a further object of the invention to provide an actuating device which in cooperation with the friction rolls can accomplish the switching action corresponding to the directions of rotation of the friction rolls.

Other objects and further features of the present invention will become apparent from the following detailed description taken in connection with the accompanying drawings wherein.

DESCRIPTION OF THE PREFERRED EMBODIMENT

Figure 1:
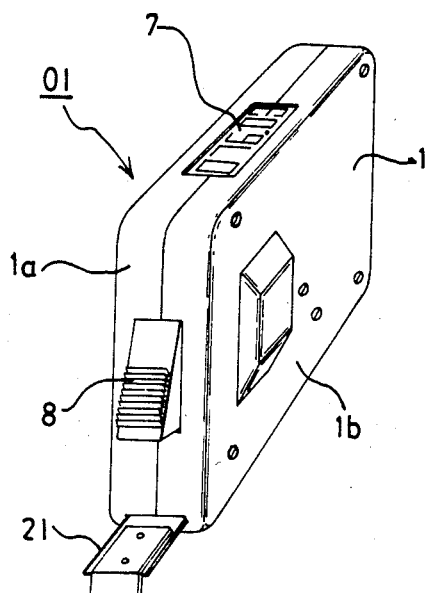
FIG. 1 is a perspective view of an electronic digital taperule according to the invention.
Figure 2:
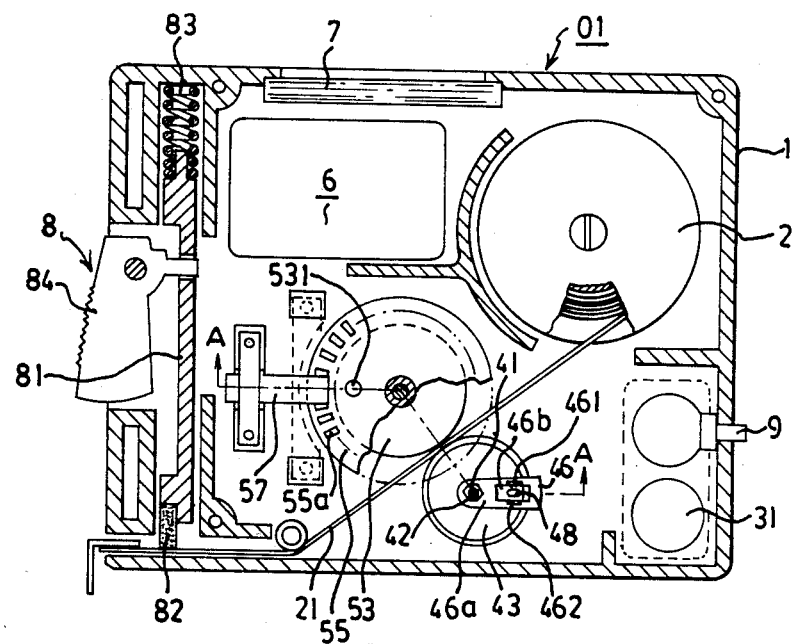
FIG. 2 is a cross-sectional view of the electronic digital tape-rule of FIG. 1, showing the arrangement of the components within a housing.

Referring to FIGS. 1 and 2, in accordance with the invention an electronic digital tape-rule 01 comprises a housing 1, a tape reel 2 having a flexible measuring tape 21 therein, a battery case 3 receiving at least one dry cell 31 therein, an actuator 4, a detector 5, a forward-backward counter 6, a display 7, a brake 8 and a power switch 9.

The structure and arrangement of tape reel 2 with an extensible measuring tape 21 therein and a brake 8 for stopping the tape 21 from moving are basically similar to those of the conventional tape measure, i.e., a non-electronic tape measure; however, in the embodiment described herein, there is ample space provided for battery case 3, actuator 4, detector 5, counter 6, display 7 and power switch 9 within housing 1.

The flexible measuring tape 21 has its free end being led out from the spring-biased tape reel 2 to a lead-out slit 11 provided at one corner of housing 1 via actuator 4 and detector 5.

According to the present invention, the improvement is chiefly in the constitution of actuator 4 and detector 5, the latter working in cooperation with the former.

Figure 4:
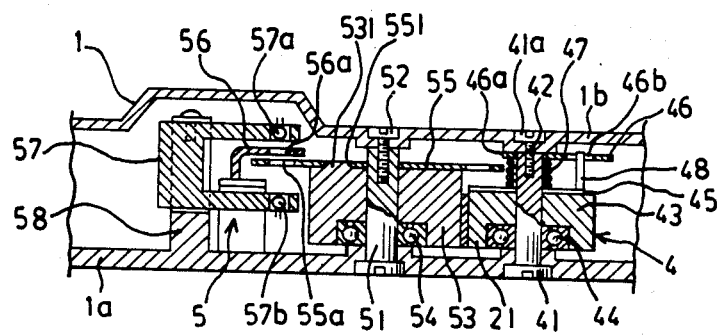
FIG. 4 is a cross-sectional view of an actuating device in cooperation with the detector in accordance with the invention.

FIG. 4 illustrates an arrangement of actuator 4 and detector 5 of the electronic digital tape rule, in which the actuator 4 comprises a shaft 41 fixed at one of the two main walls 1a, 1b of housing 1, for example, at wall 1a, with its upper end portion 41a being formed of a polygonal section and the rest portion a cylindrical section, and the upper end being fastened to the other wall 1b by a screw 42 passing through the latter. A friction or pressure roll 43, which is generally a resilient rubber roll, is rotatably mounted on shaft 41 by means of a bearing 44, and a rotatable disc 45 is mounted coaxially on the upper side of the roll 43 and rotatable therewith by friction. A fixed plate 46 is disposed on the upper end portion 41a of shaft 41 by fitting a polygonal hole 46a provided thereon onto the same polygonal shaft portion 41a, and has a further hole 46b which is generally in sector shape and is provided with two contact plates 461, 462 being located on both side walls thereof. A compression spring 47 is mounted between a disc 45 and plate 46 for biasing the disc 45 constantly against the upper surface of friction roll 43, whereas an actuating rod 48 is disposed with its one end fixed on the upper surface of rotatable disc 45 and the other end engaging sector hole 46b.

The detector 5 comprises a shaft 51 fixed at the wall 1a of the housing in the same manner as shaft 41 and screwed by a screw 52 passing through wall 1b to the shaft 51. A friction or pressure roll 53, which is generally a resilient rubber roll, is rotatably disposed on shaft 51 by means of a bearing 54; a rotating disc 55 is fixedly and coaxially mounted on the upper end of the roll 53 having a positioning pin 531 inserted in a hole 551 provided on the disc. The diameter of disc 55 is larger than that of roll 53 so that its outer periphery protrudes out radially from and is rotatable with roll 53, which includes a plurality of slits 55a arranged in a circle on the outer peripheral portion thereof. A sensor assembly 57 is mounted on a supporting member 58 which is protruded upwardly from wall 1a and a shield plate 56 which has a slit 56a is located between sensor assembly 57 and disc 55.

The light emitter 57a and photo sensor 57b of the sensor assembly 57, the slit 56a of shield plate 56 and one of slits 55a are generally located in a straight line so that the rotation of the roll 53 will cause rotating disc 55 to rotate together with roll 53 and will be sensed by the sensor assembly 57.

The brake 8 comprises a rod 81 being provided within the housing 1 and having a friction pad 82 attached on its lower end, a coil spring 83 constantly biasing on the upper end of rod 81 for pressing pad 82 on the free end portion of tape 21 and a push button 84 having a pin 85 engageable in a hole 86 of the rod 81 to keep pad 82 pressing on tape portion 21 and releasable by pushing button 84.

Figure 3:
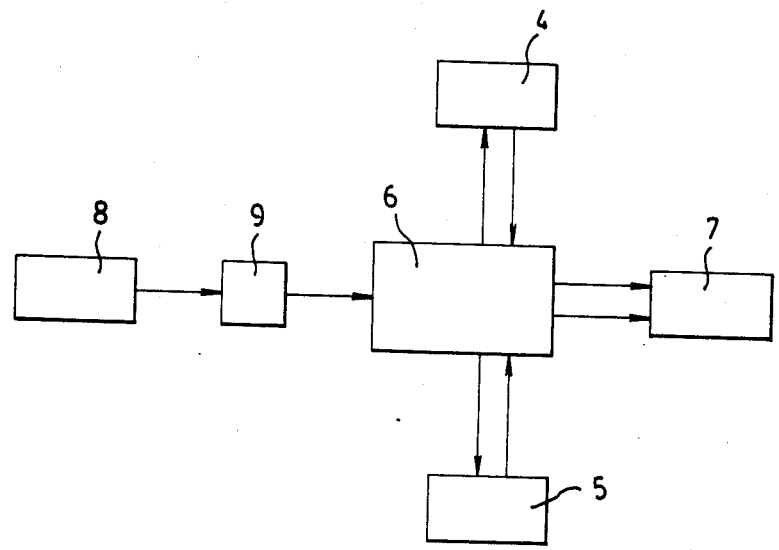
FIG. 3 is a block diagram of a detector and display according to the invention.

FIG. 3 illustrates a block diagram of the electronic connection of the tape rule according to the invention, wherein the electronic circuit of batteries 8, switch 9, counter 6, actuator 4, detector 5 and display 7 is shown.

In the application of the electronic digital tape rule in a linear measurement, switch 9 is first turned on, whereby all the components of the tape rule as shown in FIG. 3 will be placed in an workable state. The free end of measure tape 21 is then pulled outwardly against the spring force of tape reel 2 and pressure force of friction pad 82. At this moment, the two friction rolls 43, 53 driven by a friction force from tape 21 which is now being tightly held therebetween, are moved to rotate synchronously in a direction indicated by the arrow A. As such, disc 45 against the force of spring 47 is also moved to rotate along with roll 43 by the friction force and so also rod 48 on the top of disc 45, which rotates together with the disc till the upper end thereof touches contact plate 461 of hole 46b when rotation of the rod 48 stops. Due to the contact of contact plate 461 and rod 48 a signal is immediately given off and sent to forward-backward counter 6 for operation of forward counting by the latter. On the other hand, as roll 53 drives rotating disc 55 to rotate together therewith, sensor assembly 57 having the light emitted by light emitter 54a, which passes through slit 56a of shield plate 56 and slit 55a of the disc 55 and which is next received by photo sensor 54b, sends off pulse signals to be delivered to forward-backward counter 6. The counter 6 next begins counting the number of slits 55a of disc 55 that have passed over the disc, that is, the number of revolutions of disc 55, and signals undergo conversion to become the linear length of tape 21 corresponding to that number of revolutions, which is then shown on display 7. This length in digital form can readily be read from that display 7.

If however, the tape that has been pulled out exceeds the length in measure and needs to be adjusted, it is necessary only to press button 84 of brake 8. Upon application of pressure on button 84, rod 81 in counteracting the force of spring 83 is lifted upward by a very slight distance, thereby permitting pad 82 to release tape 21 which, in a subsequent action, is rewound back into tape reel 2 under the immediate resilient action of a rewinding spring located therein. In so doing, the pulled-out end portion of tape 21 is being gradually shortened and until when it comes close to and is in the vicinity of the required length, press button 84 is released and biased by the force of spring 83, rod 81 pushes downward enabling pad 82 to press against tape 21 again so that the latter will not move any longer.

During its withdrawing and shrinking towards the inside of housing 1, tape 21 with friction force moves rolls 43, 53 to rotate in a direction opposite that described above, that is, in a direction counter the one shown by arrow A. Therefore, as rod 48 carried by disc 45 rotates together with the disc, this rod 48 is released from contact with contact plate 461 and comes into contact with the other contact plate 462. A signal is thus generated at this contact, which is transmitted to forward-backward counter 6 for operation of backward counting by the latter. On the other hand, roll 53, as described before, rotates together with roll 43 thereby driving rotating disc 55 to rotate in a direction opposite that described above. Sensor assembly 57, in a like manner as described before, starts counting down now the number of revolutions of disc 55 and after subtracting the length of tape 21 that has been withdrawn, the remaining length of the tape is shown in digital form on display 7. In this way, the extended tape can be pulled out to the required length or the length of the extended tape that has been pulled out in excess can be withdrawn by controlling brake 8 till the required length has reached, and the length of the extended tape can then be adjusted into the length of an object to be measured and this length can next be read out from display 7.

If the tape is not in use and is to be rewound back into housing 1, it is necessary only to press down button 8 whereby the extended tape will be withdrawn into tape reel 2 by a spring force and at this time, the digital unit will be returned to indicate zero on display 7. Finally, switch 9 is turned off to cut off the power source.

From the above, it is possible therefore to indicate the length of an object to be measured on display 7 by pulling out the tape from or withdrawing the tape into tape reel 2. However, it is to be contemplated that when the tape is pulled out or withdrawn into tape reel 2, during the brief period before rod 48 has been shifted from one contact point and come into contact with the other point, counter 6 will not have assumed any operation yet. Still, as the tape has already been in movement, therefore, before counter 6 has begun any counting, at the free end portion of the tape where extension or withdrawal is carried out there will be a length of the tape which has not been calculated in counter 6. Because this un-calculated length is so short, generally within the permissible range of error for a measurable length by a typical flexible rule, the length can thus be neglected from calculation. To remove such error from a measurement, it can also be contemplated that the uncalculated length be added before to the value of counting pulses started in counter 6 for calculation so that the concern for an error in initial counting can be avoided.

As described above, the present invention has for its purpose to provide a most practically applicable construction of an electronic digital tape rule.

While a preferred embodiment of the invention has been shown and described, it will be apparent to those skilled in the art that various changes and modifications may be made therein without departing from the spirit and scope of the invention as claimed.

1. An electronic digital tape. rule consisting of a housing, a rotatable tape reel encased within said housing and having a flexible and extensible measuring tape, a power source for supplying electric power to the electronic circuit, an actuator acting as a switch means for selecting a forwarding or backwarding count of a counter, a detector for sensing the number of revolutions of a disc as the tape is extended and for generating a signal in response thereto, a counter responsive to the signal generated by said detector for accumulating a count representative of the length of said tape, a display for displaying the count accumulated by said counter, a brake for stopping and releasing said tape and a power switch; characterized by that said actuator comprising:
- a friction roll rotatably mounted on a shaft fixed at an inner wall of said housing;
- a disc disposed on the upper end of said roll and rotatable by the friction of the roll;
- a plate fixed on the upper end of said roll and having a hole with a pair of contact plates attached on the two side walls thereof;
- a spring mounted between said disc and said plate for constantly pressing the disc against said roll; and
- an actuating rod disposed upright on the upper side of said disc and being arranged in such a manner that its upper end passes through the hole of said plate and is able to contact one of said two contact plates depending on the rotating direction of said disc.

2. An electronic digital tape rule according to claim 1, wherein said detector comprises:
- a friction roll being rotatably mounted on a shaft fixed at an inner wall of said housing and being located to engage with the friction roll of said actuator,
- a rotating disc being coaxially mounted on the upper end of said roll and having a plurality of slits arranged in a circle on the outer periphery of said disc which protrudes outwardly from said roll,
- a sensor assembly being disposed on a support formed on the inner wall of said housing and including a photo sensor and a light emitter, and
- a shield plate being located between said rotating disc and said sensor assembly and having a slit corresponding to the slit of the rotating disc.

3. An electronic digital tape rule according to claim 1, wherein said flexible measuring tape is led out from said tape reel and its free end is arranged to pass between said two friction rolls and out from an opening provided on said housing.

* * * * *